United States Patent
Hirano et al.

(10) Patent No.: US 8,908,316 B2
(45) Date of Patent: Dec. 9, 2014

(54) DISK DRIVE WITH WRITE CLOCK FREQUENCY COMPENSATION FOR EXTERNAL VIBRATION DISTURBANCE

(75) Inventors: Toshiki Hirano, San Jose, CA (US); Xiaotian Sun, Saratoga, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 13/373,970

(22) Filed: Dec. 5, 2011

(65) Prior Publication Data
US 2013/0141811 A1 Jun. 6, 2013

(51) Int. Cl.
*G11B 21/02* (2006.01)
*G11B 5/596* (2006.01)

(52) U.S. Cl.
USPC .......................................... 360/75; 360/77.04

(58) Field of Classification Search
USPC ............... 360/73.03, 73.01, 73.02, 75, 77.02, 360/77.06, 69, 77.04; 369/13.13, 13.33, 369/44.27, 44.28, 44.32
See application file for complete search history.

(56) References Cited

U.S. PATENT DOCUMENTS

| | | | |
|---|---|---|---|
| 6,304,406 B1 * | 10/2001 | Douglas et al. ............ | 360/73.03 |
| 6,383,598 B1 | 5/2002 | Fullerton et al. | |
| 6,754,017 B2 | 6/2004 | Rettner et al. | |
| 6,876,168 B1 | 4/2005 | Luo et al. | |
| 6,947,243 B2 | 9/2005 | Dang et al. | |
| 6,963,463 B2 * | 11/2005 | Sri-Jayantha et al. ......... | 360/75 |
| 7,133,229 B2 | 11/2006 | Semba | |
| 7,239,682 B2 | 7/2007 | Liu et al. | |
| 7,675,703 B2 | 3/2010 | Albrecht et al. | |
| 7,768,738 B2 | 8/2010 | Abramovitch et al. | |
| 7,852,587 B2 * | 12/2010 | Albrecht et al. ................ | 360/59 |
| 7,961,578 B2 | 6/2011 | Sado | |
| 8,379,342 B2 * | 2/2013 | Huang et al. .................... | 360/75 |
| 2006/0280975 A1 | 12/2006 | Albrecht et al. | |
| 2009/0244765 A1 | 10/2009 | Albrecht | |
| 2010/0067357 A1 | 3/2010 | Huang et al. | |
| 2010/0118426 A1 | 5/2010 | Vikramaditya et al. | |
| 2010/0309576 A1 | 12/2010 | Albrecht et al. | |
| 2011/0085260 A1 | 4/2011 | Wada et al. | |

FOREIGN PATENT DOCUMENTS

| | | | |
|---|---|---|---|
| JP | 2000182343 A1 | 6/2000 | |
| JP | 2002109840 A1 | 4/2002 | |

OTHER PUBLICATIONS

Roger Ku Chiao-Ping, et al.; High Frequency Radial Mode Vibration in Hard Disk Drive, IEEE Trans. Magnetic. vol. 47, No. 7, Jul. 2011, pp. 1893ff.
T. Eguchi, et al.; An Improved Component-Mode Synthesis Method to Predict Vibration of Rotating Spindles and Its Application to Position Errors of Hard Disk Drives; Transactions of the ASME, vol. 128, Oct. 2006, pp. 568ff.

* cited by examiner

*Primary Examiner* — Nabil Hindi
(74) *Attorney, Agent, or Firm* — G. Marlin Knight

(57) ABSTRACT

A disk drive is described that uses a vibration sensor to generate a compensating feed-forward control signal to synchronize the write clock frequency with the modulated data island frequency. A linear vibration sensor is positioned with its sensitivity axis aligned with the tangential direction of a track at the radial position of the write head. The tangential component of the external linear vibration is measured by the sensor. The feed-forward control signal derived from the linear vibration sensor modifies the control voltage input to VCO (voltage controlled oscillator) in the write clock generator to adjust the write clock frequency to compensate for the modulated data island frequency caused by the tangential component of the linear vibration.

16 Claims, 4 Drawing Sheets

DISK DRIVE WITH WRITE CLOCK FREQUENCY COMPENSATION FOR EXTERNAL VIBRATION DISTURBANCE

FIELD OF THE INVENTION

This invention relates generally to disk drives with magnetic recording media, and more particularly to electronic control systems used with patterned magnetic recording disks with discrete magnetic islands and even more particularly to electronic control systems in such disk drives that compensate for external vibration.

BACKGROUND

Hard disk drives (HDD) use rotating disks with thin film magnetic coatings to record data. The read and write heads for each disk surface are found in a slider that is selectively positioned over the rotating disk using a rotary actuator driven by a voice coil motor controlled by a servo system. External vibrations can interfere with the drive's ability to properly write and read data in the tracks. Therefore, to improve the drive's ability to overcome problems caused by vibrations, vibration sensors can be mounted on the drive to allow the servo system to compensate for certain vibrations. A rotational vibration (RV) sensor is commonly used in disk drives. The sensors are typically mounted on the printed circuit board along with other electronic components. The mounting should be rigid to reduce sensor noise. One type of RV sensor uses two linear accelerometers oriented on different axes as linear vibration sensors. The two uniaxial acceleration sensors can detect vibration and rotation in an in-plane direction.

Rotational vibration (RV) cancellation uses detected rotational vibration to improve the position error signal (PES) for the actuator by canceling the off-track motion induced by the rotational vibration. The measured RV is input to a feed-forward control circuit that creates a feed-forward compensation signal that is summed with the control signal to the voice coil motor (VCM) for the actuator.

This method is sometimes called RV feed-forward (RVFF). The two vibration sensors should have similar gains in their primary-axis sensitivities and minimal off-axis sensitivities.

In published US patent application 20100067357 Huang, et al. (Mar. 18, 2010) describe a disk drive that compensates for rotational vibration by adaptively modifying the gains of two separate linear vibration sensors. The two sensors provide two signals to the disk drive's servo control processor which generates the control signal to the voice coil motor (VCM) that controls the positioning of the read/write head. The servo processor uses the two signals and the head position error signal (PES) as inputs to run an adaptive rotational vibration feed-forward (RVFF) algorithm to derive the control signal for the VCM actuator.

In conventional disk drives the magnetic thin films are continuous so the circular tracks are magnetic constructs created by writing magnetic transitions as the disk rotates under the head. In patterned magnetic media for disk drives, the thin film magnetic recording layer on the disk can be formed with isolated data islands that have a single magnetic domain in each island which is used to record a binary bit of data. The data island magnetic domains can consist of one grain or a small group of grains that are strongly coupled and therefore, switch together. Various methods of fabricating the data islands have been described including physical removal of the magnetic material around the islands. However, physical removal is not required. See, for example, Fullerton, et al. U.S. Pat. No. 6,383,598 which describes the fabrication of patterned magnetic recording media with regions between the islands rendered nonmagnetic by ion irradiation.

The writing of data in data islands are timed (clocked) to synchronize with movement of the data islands under the write head. In U.S. Pat. No. 6,754,017 Rettner, et al. (Jun. 22, 2004) describe a magnetic recording disk drive with patterned disk media, wherein the data islands are used as the source of the clocking signal to the write head. The slider with the read/write head also includes a special pattern sensor that senses the data islands in the tracks just before they pass beneath the write head. The pattern sensor output serves as the clocking signal to precisely control the timing of the write pulses supplied to the write head. A time delay is calculated using a timing mark on the patterned disk to delay the write pulses so that a data block sensed by the pattern sensor is the same data block to which the write pulse is applied. In this manner the previously recorded magnetic data provides the synchronization or clocking signal to control the writing of the new data.

In U.S. Pat. No. 7,675,703 Albrecht, et al. (Mar. 9, 2010) describe a disk drive with patterned media and a system for clocking write data. The precise time intervals between successive timing marks in the data tracks are measured by a timing mark detector that counts the integer number of write clock cycles between successive timing marks and the fractional part of a write clock cycle by detecting the phase difference between a timing mark and a reference signal. The resulting timing error is output to a write clock compensator. The write clock is capable of generating equally spaced primary phases and phases intermediate to the primary phases. The compensator includes a phase rotator that controls which write clock phase is selected for output. The value in a phase register of the compensator is used to control the phase rotator to advance or retard the write clock phase, and thus to adjust its frequency and phase so as to be synchronized for writing to the data blocks.

In U.S. Pat. No. 7,961,578 Hideo Sado (Jun. 14, 2011) describes a disk drive with a synchronous clock generator that inputs the rotational acceleration of the spindle motor as feed-forward control value to the feedback control system provided in the drive disk, thereby generating a clock that is synchronous with the rotational speed of the disk.

Published US patent application 20100118426 by Vikramaditya, et al. (May 13, 2010) describes a write clock control system that includes a clock controller that determines a phase offset based on a phase difference between a write clock signal and a media pattern corresponding to a given timing synchronization field being read, and a phase interpolator that produces an updated write clock signal by updating the phase of the write clock signal in accordance with control signals that are based on the phase offset signal.

In U.S. Pat. No. 6,947,243 Dang, et al. (Sep. 20, 2005) describe a disk drive that senses a rotational vibration without using any external sensor by measuring the time shift of the magnetic transitions (e.g., time jitters or bit jitters) for reference bits on the rotating disk.

Write clock compensation for write head track misregistration (TMR) from the track centerline is described in US patent application 20100309576 by Albrecht, et al. (Dec. 9, 2010). As the disk rotates, the read head detects angularly spaced servo sectors and generates a position error signal (PES) which is used by the servo control system to maintain the read head on track. As the disk rotates, the read head also detects angularly spaced synchronization marks, which are used to control the write clock so that magnetization reversal of the magnetic write field from the write head is synchronized with the position of the data islands. If there is TMR of the write head, there will be an effective shift in the timing of when the center of the data islands pass through the write field. The disk drive includes write clock phase adjustment circuitry that correlates the PES with the timing shift to compensate for TMR of the write head.

Another US patent application 20090244765 by T. Albrecht (Oct. 1, 2009) describes a patterned magnetic recording disk drive that compensates for circumferential misalignment of data island patterns among the data tracks as a result of errors in fabrication of the master template used to make the disks. To compensate for pattern circumferential misalignment (PCM) the phase of write clock for writing to the data islands is adjusted.

In U.S. Pat. No. 7,133,229 Tetsuo Semba (Nov. 7, 2006) describes a magnetic recording disk drive with patterned media with data islands and compensation for write-clock timing error caused by rotational disturbances. A rotational vibration sensor is used in conjunction with a write-clock-generation circuit to adjust the timing of the write pulses to correct for errors caused by rotational disturbances. The write-clock-generation circuit receives a reference clock signal synchronized to disk rotation and multiplies it to generate a higher-frequency write-clock signal. The write-clock-generation circuit includes a phase detector that compares the phase of the reference clock signal and the write-clock signal and provides an error signal. The output of the rotational vibration sensor is summed with the phase detector error signal to compensate for disk rotation speed changes caused by rotational disturbances.

SUMMARY OF THE INVENTION

Due to the finite stiffness of the fluid dynamic bearing (FDB) of the spindle motor, the disks move when the HDD is subject to linear external vibration. In general, the disk's lateral displacement is in the same direction as the external linear vibration. If the external vibration has a component in the tangential direction, this disk lateral vibration will modulate the spindle rotation frequency and cause jitter in the data island frequency as seen by the writer. Embodiments of the invention compensate for the jitter caused by linear vibration disturbance in the circumferential direction.

Embodiments of the invention include a disk drive that uses a linear vibration sensor (accelerometer) to generate a compensating feed-forward control signal to synchronize the write clock frequency with the modulated data island frequency. The linear vibration sensor is positioned with its sensitivity axis aligned with the tangential direction of one or more selected tracks at the radial position of the write head (writer) for the selected tracks. In an embodiment the radial position is selected to be the average radial position of the write head when it moves from the inner diameter (ID) to the outer diameter (OD).

The tangential component of the linear vibration is measured by the sensor. The sensor output can be either digitized or used in the analog form. Depending on whether the sensor output is digitized or not, digital or analog filters are used to process the sensor output to form the feed-forward control signal. The feed-forward control signal is added into the control voltage input to VCO (voltage controlled oscillator) in the write clock generator to adjust the write clock frequency so that it matches the modulated data island frequency.

DETAILED DESCRIPTION OF THE INVENTION

Figure 1:
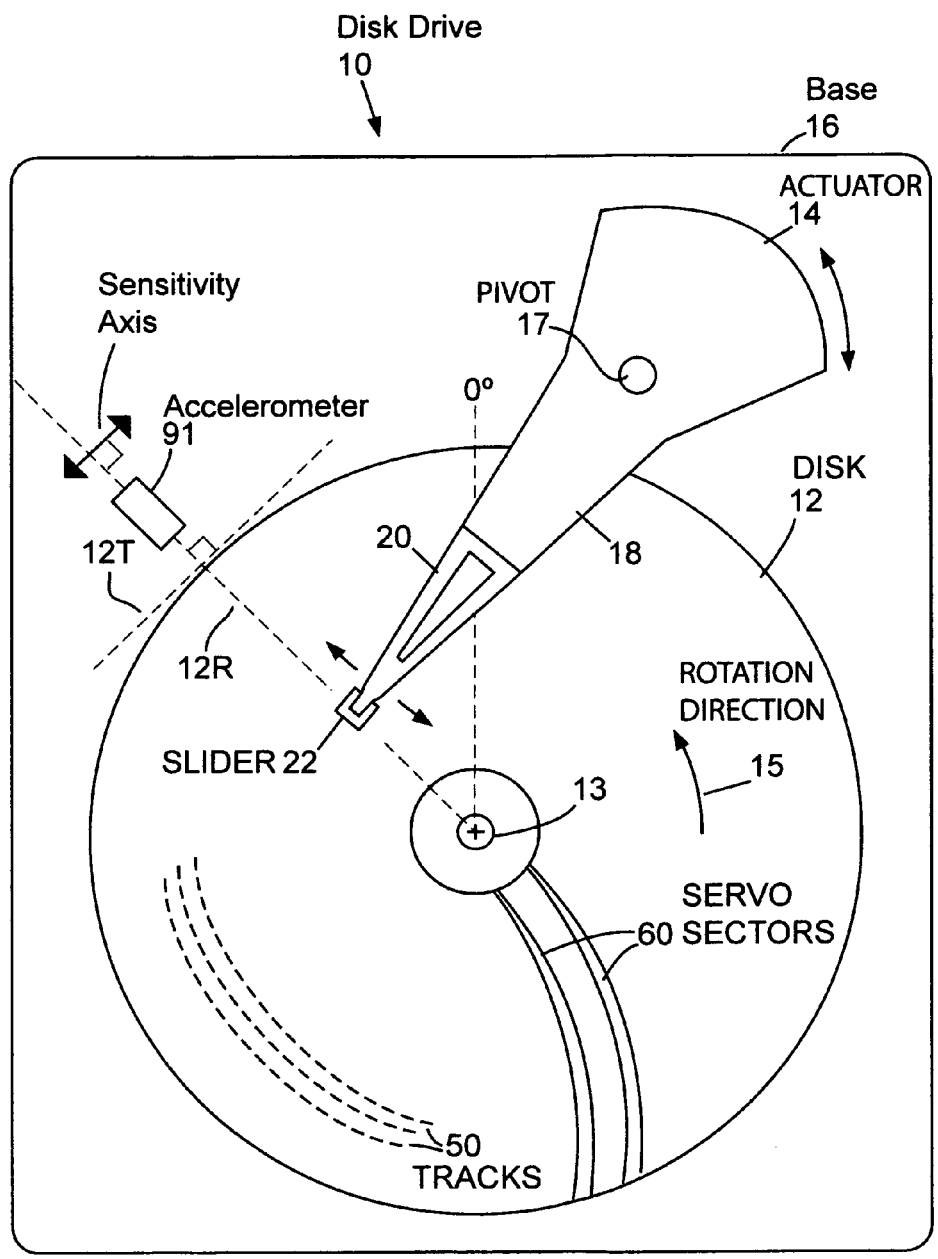
FIG. 1 is an illustration of a top view of a disk drive according to the invention with the upper portion of the outer protective case removed.

FIG. 1 is an illustration of a disk drive 10 according to an embodiment of the invention. The disk drive includes a magnetic recording disk 12 that rotates on axis of rotation 13 in direction 15 driven by a spindle motor (not shown). Housing or base 16 provides support for the components. The upper portion of the outer protective case, which is present for normal operation, is removed for this illustration. Embodiments of the invention include a disk drive that has one or more magnetic recording disks 12 with thin films which have been patterned with data islands (shown in FIG. 2) that include magnetic material, which is separated by nonmagnetic regions. The data islands are arranged in concentric, circular data tracks, such as typical tracks 50, only a small portion of which are shown. In practice there are thousands of tracks that extend 360 degrees around the disk. The disk drive includes actuator 14 is pivoted on axis 17 by a rotary voice coil motor (VCM (not shown). The actuator 14 includes a rigid actuator arm 18. A flexible suspension 20 includes a flexure element (not shown) and is attached to the end of arm 18. Air-bearing slider 22 contains the read/write heads (not shown) and is attached to the flexure. Read/write heads (not shown) are formed on the trailing surface of slider 22. The flexure and suspension 20 enable the slider to "fly" over the disk surface on an air-bearing generated by the rotating disk 12.

As the disk 12 rotates in the direction 15, the read head is positioned over a track to detect (read) the magnetic transitions that have been written in data islands in the track. The read head also detects the sector timing marks (STMs) that indicate the start of angularly spaced servo sectors 60 in the data tracks. Only two of the many servo sectors 60 are shown for simplicity. STMs are used as a reference clock signal to control the timing of the write clock so that the write head generates magnetic write pulses precisely timed with the passage of the data islands under the write head.

The disk drive also includes an accelerometer 91. The accelerometer 91 is a selective vibration sensor that can be rigidly attached to the base 16 as shown. However, the accelerometer 91 may be more conveniently mounted on a printed circuit board or card (not shown) that contains electronic components of the disk drive. The accelerometer 91 can be positioned under the disk. The printed circuit board is attached to base 16.

The orientation of the sensitivity axis of accelerometer 91 should be selected to capture the component of any vibration that is most likely to cause the write pulses to be improperly timed in relation to the passage of the data islands under the write head. Therefore, the sensitivity axis of accelerometer 91 should be oriented parallel to a hypothetical tangent line 12T drawn touching the circumference of disk 12 and perpendicular to the radial line 12R, which passes through the position of the write head over a selected track. The accelerometer 91 can be positioned at various points along the radial line 12R including under the disk. However, in order to maximize the sensitivity to tangential components of vibration the accelerometer 91 should preferably be located near the outer diameter of the disk. The vibration detected by the accelerometer can be from internal sources, such as movement of the disk drive actuator, as well as external disturbance to device's case.

Because the actuator moves the slider 22 containing the write head in an arc between the inner diameter (ID) to the outer diameter (OD), the sensitivity axis of the accelerometer 91 can only be precisely parallel to the tangent 12T and perpendicular to the radial line 12R passing through the write head at a maximum of two points in the arc. These two points correspond to two tracks that are separated a relatively large number of tracks.

Figure 4:
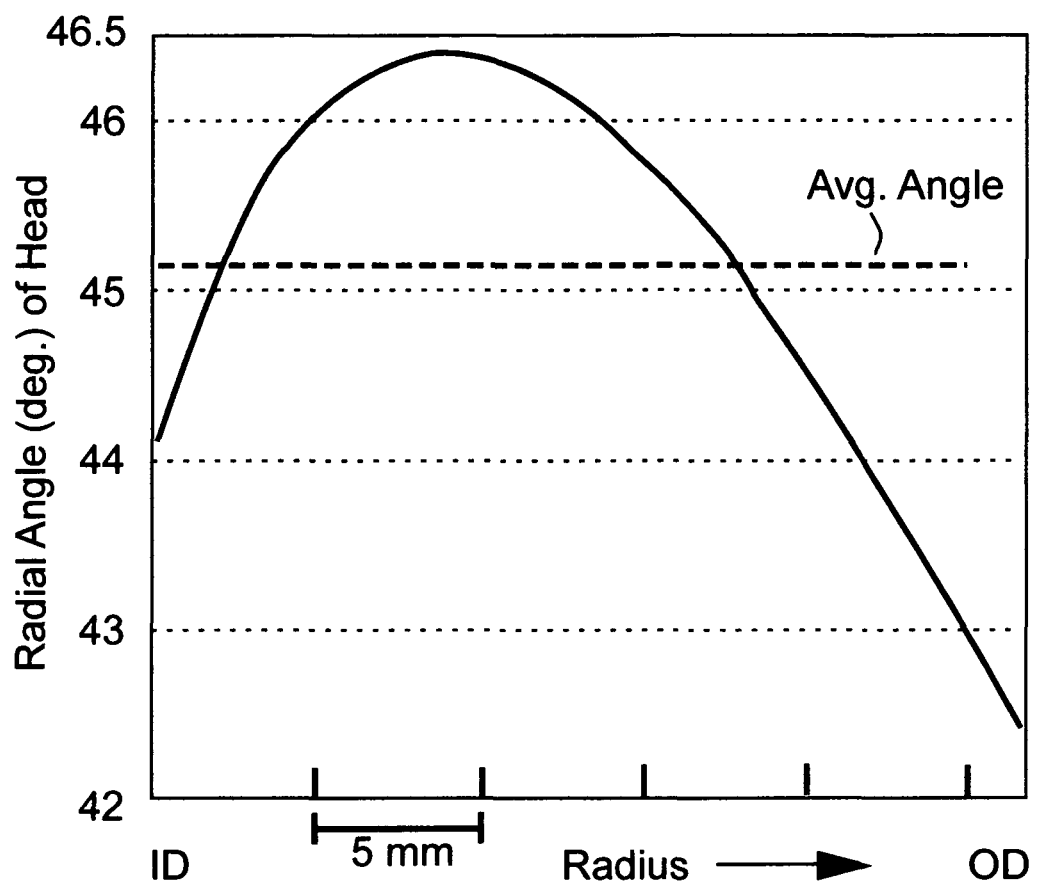
FIG. 4 is a graph of the radial angle of the head versus the radial position for an exemplary write head across a disk according to an embodiment of the invention.

One method of selecting the radial line 12R will be described with reference to FIG. 4, which is an exemplary graph of the radial angle versus the length of the radius measured from the write head to the center of rotation of the disk. The precise shape of this curve will vary according to the design of the disk drive, but the principle will be the same for any drive that moves the write head in an arc on the disk. The method of selecting the radial line 12R in this embodiment is to use the average angle computed from the radial angle versus the radius as shown in FIG. 4. Therefore, in this example the radial line 12R would be selected to be a fraction of a degree over 45 degrees from the 0 degree line which is at the top of the disk as shown in FIG. 1.

Figure 2:
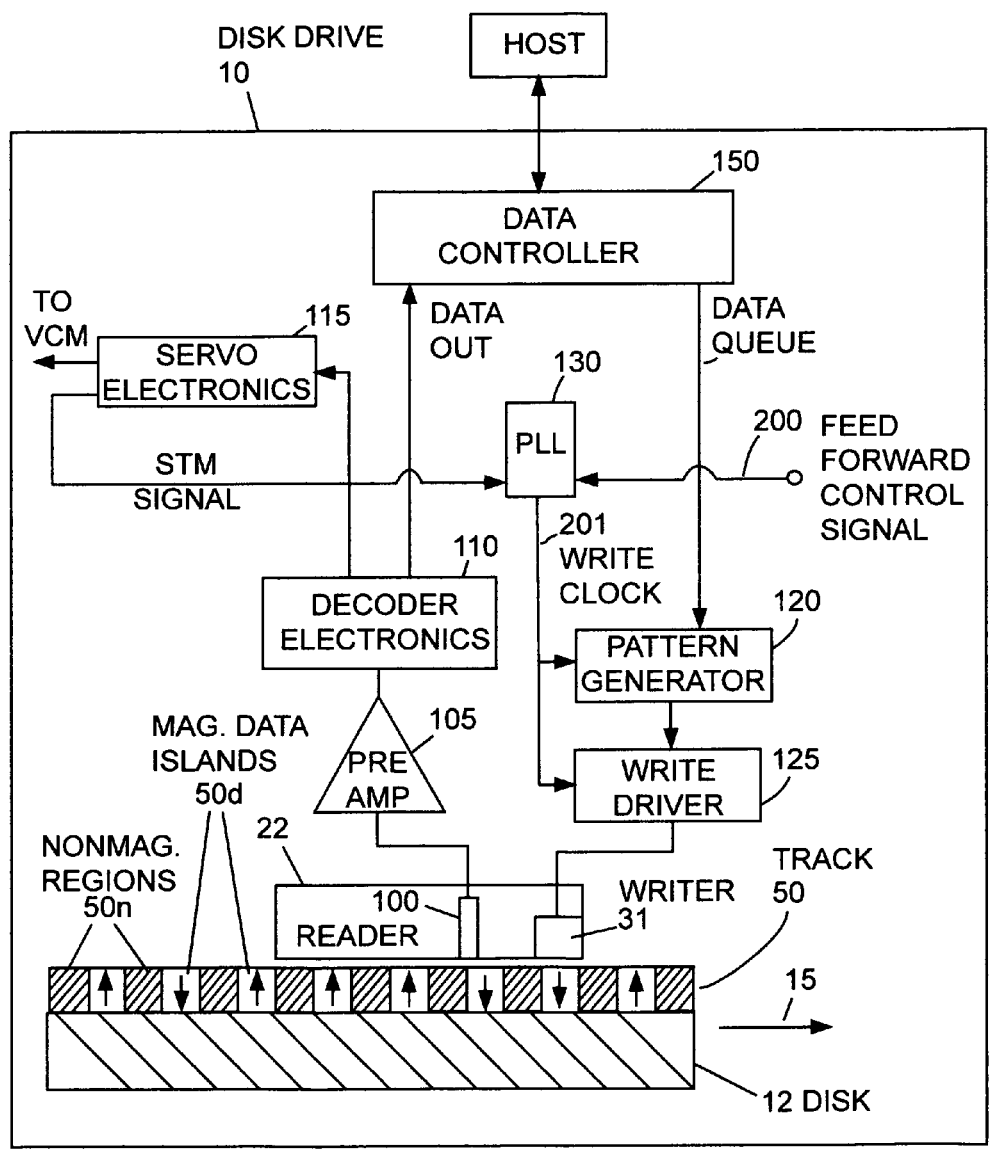
FIG. 2 illustrates a sectional view of the magnetic recording disk with a patterned magnetic recording layer and shows the read and write heads connected to the data controller for the transfer of data to and from the host system.

FIG. 2 illustrates selected electronics functions in disk drive 10 and shows a small sectional view of the magnetic recording disk 12 and air-bearing slider 22. The track 50 is patterned with magnetic data islands 50d separated by nonmagnetic regions 50n. The air-bearing slider 22 is depicted in sectional view flying above disk 12 and is shown with the read head (reader) 100 and the write head (writer) 31. The disk 12 is moving from left to right as shown in the figure. The arrows depicted in the magnetic data islands 50d represent the magnetization directions in the islands, which in this embodiment are shown for perpendicular magnetic recording. The write head generates a magnetic field to write (magnetize) the magnetic domains in the data islands in one of the two magnetization directions, depending on the direction of current through the coil of the write head. Because there is no magnetic material between the data islands, the write pulses must be precisely timed to efficiently magnetize the correct data islands.

FIG. 2 also shows schematically the transfer of data between a host system, such as a PC, and the disk drive. The signals from recorded data and servo sectors in the data tracks of disk 12 are detected by read head 100, amplified by pre-amplifier 105 and sent to decoder electronics 110. Decoder electronics 110 sends the data to data controller 150 and servo information to servo electronics 115. Servo electronics 115 decodes the servo information and generates control signals to the VCM (not shown). The servo electronics 115 also includes a STM decoder that generates the STM signal that serves as the reference clock signal. The data to be written to the disk 12 is sent from the host to the data controller 150 and then as a data queue to pattern generator 120 and then to write driver 125. The write driver 125 generates high-frequency current pulses to the coil of the thin film inductive write head 31 which results in the magnetic write fields that magnetize the data islands 50d. Phase-locked loop (PLL) 130 is the write-clock-generation circuit in this embodiment. PLL 130 receives the STM signal as a reference clock signal and generates a write-clock signal 201 for timing the pattern generator 120 and write driver 125. In this embodiment of the invention, the PLL 130 also receives an input of the feed forward control signal 200, which will be shown in more detail in FIG. 3.

In order to properly coordinate the writing magnetic pulses to the data islands 50d, the write-clock timing should be adjusted for physical disturbances that are tangential to the circular tracks as illustrated by orientation of accelerometer 91 in FIG. 1.

Figure 3:
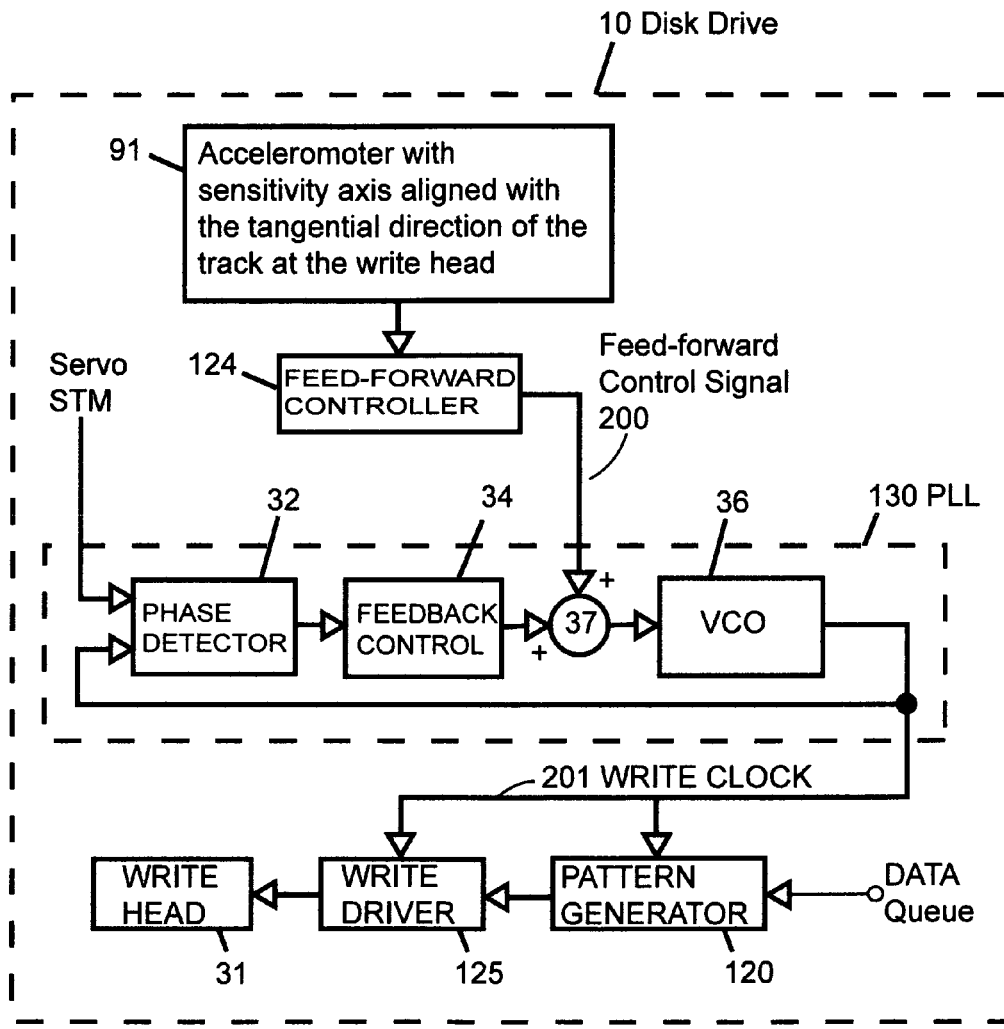
FIG. 3 is a block diagram of selected components of a write-clock-generation circuit according to an embodiment of the invention.

FIG. 3 is an illustration of selected components of a disk drive 10 according to an embodiment of the invention with an accelerometer (vibration sensor) 91 that in combination with feed-forward controller 124 generates a compensating feed-forward control signal 200 to modify timing write pulses generated by the PLL 130 to the write head 31 to adjust for effects of the component of the linear vibration that is tangential to the circular recording tracks on the disk (not shown).

An accelerometer 91 can be a single linear accelerometer of the type that is used in pairs for RVFF. Depending on specific sensor model, the upper limit on the frequency range can be about 20-40 kHz. The tangential component of the linear vibration is measured by the accelerometer 91, which must be rigidly mounted in the disk drive and physically oriented as described above.

In the absence of the feed-forward control signal 200 according to the invention, the write clock frequency is synchronized with the default data island frequency, i.e. the normal rate at which the data islands pass under the write head as the disk rotates. It should be noted that the standard feedback-based phase-locked-loop (PLL) control adjustment cannot respond to faster (i.e. high-frequency) disturbance due to the limit of the closed-loop bandwidth. However, the feed-forward control signal 200 acts at a high frequency to synchronize the write clock frequency with the data island frequency as it is disturbed or modulated by tangential vibration as detected by the accelerometer 91. Thus the feed-forward control signal 200 adjusts the timing of the write clock pulses to correct for deviations caused by the selected component of vibration affecting the disk drive.

The write clock 201 is generated in this embodiment is by PLL 130 as shown in FIG. 3. Standard functional blocks components in the PLL include the phase detector 32, feedback controller 34, and the voltage-controlled oscillator (VCO) 36. Voltage adder 37 combines the feed-forward control signal 200, which is the conditioned accelerometer output signal, with the output from the feedback controller 34 to supply the composite signal to the input of the voltage-controlled oscillator (VCO) 36. Feed-forward controller 124 is used to remove noise and adjust the phase and gain level of the signal from the accelerometer so that it is appropriate to feed into voltage adder 37. The phase detector 32 uses a negative feedback loop from the VCO output and compares the phase of the reference clock signal and the VCO output to produce one component of the error signal to the VCO. The reference clock signal for the phase detector 32 in this embodiment is provided by servo sector timing marks (STMs) that are detected as the read heads pass over the equally-angularly-spaced servo sectors in the concentric data tracks on the rotating disk. However, the invention is applicable to disk drives that use other reference clock signals. For example, a reference clock signal can derived from data islands in the patterned media as the disk rotates.

The data is written to the disk in the conventional manner for a patterned disk with data islands. The serialized data queue is fed into to pattern generator 120, which transforms the data into an appropriate form for writing magnetic transitions on the disk. Write driver 125 generates current pulses to the coil of the write head 31 which records data by selectively magnetizing the data islands.

A digital version of the embodiment can be derived in a straight forward manner using standard techniques.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

The invention claimed is:

1. A disk drive comprising:
   a disk with thin films deposited on a surface, the thin films being patterned in generally circular tracks of isolated data islands that have a single magnetic domain in each data island;
   a write head that is positionable over the tracks to write the magnetic domains in the data islands responsive to a write clock signal as the disk rotates under the write head, the writer head moving in an arcing path over the tracks on the disk from the inner diameter to an outer diameter;
   a linear vibration sensor positioned with a sensitivity axis substantially aligned perpendicularly to a radial line from a center of the disk, the radial line intersecting the arcing path at first and second points where the head is positionable over first and second selected tracks respectively with first and second tracks being separated by a plurality of tracks; and
   a write clock signal generator that generates the write clock signal using a feed-forward control signal derived from the linear vibration sensor, the feed-forward control signal modifying the write clock signal to compensate for linear vibration components perpendicular to the radial line.

2. A disk drive comprising:
   a disk with thin films deposited on a surface, the thin films being patterned in generally circular tracks of isolated data islands that have a single magnetic domain in each data island;
   a write head that is positionable over the tracks to write the magnetic domains in the data islands responsive to a write clock signal as the disk rotates under the write head;
   a linear vibration sensor positioned with a sensitivity axis substantially aligned with a tangential direction with respect to the tracks at the write head; and
   a write clock signal generator with a feed-forward control signal derived from the linear vibration sensor, the feed-forward control signal modifying the write clock signal to compensate for linear vibration components in the tangential direction with respect to the tracks at the write head;
   wherein the linear vibration sensor is positioned with the sensitivity axis aligned perpendicularly to a radial line from a center of the disk, the radial line being at a radial angle that is an average radial angle when the write head moves from an inner diameter to an outer diameter.

3. The disk drive of claim 1, wherein the write clock signal generator further comprises a voltage adder and a voltage-controlled oscillator and wherein the voltage adder adds the feed-forward control signal into an input signal to the voltage-controlled oscillator which outputs the write clock signal.

4. The disk drive of claim 3 wherein the write clock signal generator further comprises a phase detector that uses a reference clock derived from a signal generated when the data islands pass under a read head.

5. The disk drive of claim 1 wherein the write clock signal generator further comprises a phase detector that uses a reference clock derived from a signal generated when angularly spaced servo timing marks pass under a read head.

6. The disk drive of claim 1 further comprising a write driver coupled to the write head for generating write pulses to the write head, the write pulses being derived from the write clock signal and a write data pattern.

7. The disk drive of claim 6 further comprising a pattern generator for generating the write data pattern for input to the write driver and wherein the pattern generator uses the write clock signal.

8. The disk drive of claim 1 further comprising a feed-forward controller which conditions the output signal from the linear vibration sensor to form the feed-forward control signal.

9. A disk drive comprising:
   a disk with thin films deposited on a surface, the thin films being patterned in generally circular tracks of isolated data islands that have a single magnetic domain in each data island;
   a write head that is positionable in an arcing path over the tracks that extends from an inner diameter to an outer diameter on the disk to selectively magnetize the data islands as the disk is rotated under the write head;
   a write driver coupled to the write head for generating write pulses to the write head derived from a write clock signal and a write data pattern;
   a linear vibration sensor positioned with a sensitivity axis aligned perpendicularly to a radial line from a center of the disk, the radial line intersecting the arcing path at first and second points where the write head is positionable over first and second selected tracks respectively with first and second tracks being separated by a plurality of tracks; and
   a write clock signal generator, which generates the write clock signal, comprising a phase-locked loop circuit with an input of a feed-forward control signal derived from the linear vibration sensor, the feed-forward control signal modifying the write clock signal to compensate for linear vibration components perpendicular to the radial line.

10. A disk drive comprising:
    a disk with thin films deposited on a surface, the thin films being patterned in generally circular tracks of isolated data islands that have a single magnetic domain in each data island;
    a write head that is positionable over the tracks to selectively magnetize the data islands as the disk is rotated under the write head;
    a write driver coupled to the write head for generating write pulses to the write head derived from a write clock signal and a write data pattern;
    a linear vibration sensor positioned with a sensitivity axis aligned with a tangential direction of the tracks at the write head; and
    a write clock signal generator comprising a phase-locked loop circuit with an input of a feed-forward control signal derived from the linear vibration sensor, the feed-forward control signal modifying the write clock signal to compensate for linear vibrations in the tangential direction with respect to the tracks at the write head; and
    wherein the linear vibration sensor is positioned with the sensitivity axis aligned perpendicularly to a radial line from a center of the disk, the radial line being at a radial angle that is an average radial angle when the write head moves from an inner diameter to an outer diameter.

11. The disk drive of claim 9, wherein the phase-locked loop circuit further comprises a voltage adder and a voltage-controlled oscillator and wherein the voltage adder adds the feed-forward control signal into an input signal to the voltage-controlled oscillator which outputs the write clock signal.

12. The disk drive of claim 9 further comprising a feed-forward controller which conditions the output signal from the linear vibration sensor to form the feed-forward control signal.

13. The disk drive of claim 9 wherein the phase-locked loop circuit includes a phase detector that uses a reference clock derived from a signal generated when the data islands pass under a read head.

14. The disk drive of claim 9 wherein the phase-locked loop circuit includes a phase detector that uses a reference clock derived from a signal generated when angularly spaced servo timing marks pass under a read head.

15. A disk drive comprising:
- a disk with thin films deposited on a surface, the thin films being patterned in generally circular tracks of isolated data islands that have a single magnetic domain in each data island;
- a write head that is positionable in an arcing path over the tracks to write the magnetic domains in the data islands responsive to a write clock signal as the disk rotates under the write head;
- a linear vibration sensor positioned with a sensitivity axis aligned perpendicularly to a radial line from a center of the disk, the radial line intersecting the arcing path at first and second points where the write head is positionable over first and second selected tracks respectively with first and second tracks being separated by a plurality of tracks;
- a feed-forward controller that generates a feed-forward control signal by conditioning an output signal from the linear vibration sensor; and
- a write clock signal generator comprising a phase-locked loop circuit including a phase detector, a feedback controller, a voltage adder and a voltage-controlled oscillator and wherein the voltage adder adds the feed-forward control signal to the output from the feedback controller to generate an input signal to the voltage-controlled oscillator, and wherein the feed-forward control signal modifies the write clock signal to compensate for linear vibration components perpendicular to the radial line.

16. A disk drive comprising:
- a disk with thin films deposited on a surface, the thin films being patterned in generally circular tracks of isolated data islands that have a single magnetic domain in each data island;
- a write head that is positionable over the tracks to write the magnetic domains in the data islands responsive to a write clock signal as the disk rotates under the write head;
- a linear vibration sensor positioned with a sensitivity axis aligned with a tangential direction with respect to a selected track at a position where the write head is positionable over the selected track;
- a feed-forward controller that generates a feed-forward control signal by conditioning an output signal from the linear vibration sensor; and
- a write clock signal generator comprising a phase-locked loop circuit including a phase detector, a feedback controller, a voltage adder and a voltage-controlled oscillator and wherein the voltage adder adds the feed-forward control signal to the output from the feedback controller to generate an input signal to the voltage-controlled oscillator, and wherein the feed-forward control signal modifies the write clock signal to compensate for linear vibrations aligned in the tangential direction with respect to the tracks where the write head is positioned;
- wherein the linear vibration sensor is positioned with the sensitivity axis aligned perpendicularly to a radial line from a center of the disk, the radial line being at a radial angle that is an average radial angle when the write head moves from an inner diameter to an outer diameter.

\* \* \* \* \*